(12) United States Patent
Hikita et al.

(10) Patent No.: US 11,583,820 B2
(45) Date of Patent: Feb. 21, 2023

(54) HYDROGEN GENERATOR

(71) Applicants: DENSO CORPORATION, Kariya (JP); University of Tsukuba, Tsukuba (JP); TOKYO INSTITUTE OF TECHNOLOGY, Tokyo (JP)

(72) Inventors: Yasuyuki Hikita, Kariya (JP); Hiroaki Yoto, Kariya (JP); Takahiro Kondo, Tsukuba (JP); Shin-ichi Ito, Tsukuba (JP)

(73) Assignees: DENSO CORPORATION, Kariya (JP); University of Tsukuba, Tsukuba (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 17/488,686

(22) Filed: Sep. 29, 2021

(65) Prior Publication Data

US 2022/0105488 A1 Apr. 7, 2022

(30) Foreign Application Priority Data

Oct. 5, 2020 (JP) .............................. JP2020-168605

(51) Int. Cl.
*B01J 16/00* (2006.01)
*B01J 19/00* (2006.01)
(Continued)

(52) U.S. Cl.
CPC ........... *B01J 16/00* (2013.01); *B01J 19/0013* (2013.01); *B01J 19/24* (2013.01); *C01B 3/08* (2013.01); *B01J 2208/00061* (2013.01)

(58) Field of Classification Search
CPC ....... B01J 6/00; B01J 7/00; B01J 16/00; B01J 19/00; B01J 19/0006; B01J 19/0013;
(Continued)

(56) References Cited

U.S. PATENT DOCUMENTS 4,098,875 A * 7/1978 Ishii ........................ C01B 3/068
423/493
9,359,199 B2 * 6/2016 Park ......................... C01B 3/08
(Continued)

FOREIGN PATENT DOCUMENTS

WO WO-2018074518 A1 * 4/2018 ........... C01B 35/026

OTHER PUBLICATIONS

Kojima, "Hydrogen Storage and Generation Using Sodium Borohydride", R&D Review of Toyota CRDL, vol. 40, No. 2, p. 31-36 (and English translation), 2005.

*Primary Examiner* — Natasha E Young
(74) *Attorney, Agent, or Firm* — Posz Law Group, PLC

(57) ABSTRACT

A hydrogen generator includes a reaction vessel, a water supply, a temperature adjustor, and a controller. The reaction vessel houses a hydrogen generating material having hydrogen generating ability. The hydrogen generating material includes a two-dimensional hydrogen boride sheet having a two-dimensional network and containing multiple negatively charged boron atoms. The controller is configured to execute a hydrogen generating mode to generate hydrogen from the hydrogen generating material and a regenerating mode to recover the hydrogen generating ability of the hydrogen generating material. The controller controls the temperature adjustor to heat the hydrogen generating material at a first predetermined temperature during the hydrogen generating mode. The controller controls the temperature adjustor to adjust the temperature of the hydrogen generating material to a second predetermined temperature and controls the water supply to supply water during the regenerating mode.

6 Claims, 4 Drawing Sheets

(51) Int. Cl.
*B01J 19/24* (2006.01)
*B01J 19/32* (2006.01)
*C01B 3/08* (2006.01)

(58) Field of Classification Search
CPC ........ B01J 19/24; B01J 19/32; B01J 2208/00; B01J 2208/00008; B01J 2208/00017; B01J 2208/00026; B01J 2208/00035; B01J 2208/00044; B01J 2208/00061; B01J 2219/00; B01J 2219/00002; B01J 2219/00027; B01J 2219/00029; B01J 2219/00049; B01J 2219/00051; B01J 2219/00054; B01J 2219/00056; B01J 2219/00058; B01J 2219/00063; B01J 2219/32; B01J 2219/324; C01B 3/00; C01B 3/02; C01B 3/04; C01B 3/06; C01B 3/065; C01B 3/08; C01B 2203/00; C01B 2203/08; C01B 2203/0805; C01B 2203/085; C01B 2203/16; C01B 2203/1614; C01B 2203/169
See application file for complete search history.

(56) References Cited

U.S. PATENT DOCUMENTS

2006/0021279 A1 2/2006 Mohring et al.
2012/0290323 A1 11/2012 Barsoum et al.
2015/0154361 A1 6/2015 Barsoum et al.
2019/0315628 A1 10/2019 Kondo et al.

\* cited by examiner

HYDROGEN GENERATOR

CROSS REFERENCE TO RELATED APPLICATION

This application is based on Japanese Patent Application No. 2020-168605 filed on Oct. 5, 2020, the disclosure of which is incorporated herein by reference in its entirety.

TECHNICAL FIELD

The present disclosure relates to a hydrogen generator.

BACKGROUND

Hydrogen releases large amount of energy when reacting with oxygen and generates water only. Thus, hydrogen is a non-polluting fuel that can be used as an alternative to fossil fuels.

SUMMARY

A hydrogen generator includes a reaction vessel, a water supply, a temperature adjustor, and a controller. The reaction vessel houses a hydrogen generating material that has hydrogen generating ability. The water supply is configured to supply water to the hydrogen generating material. The temperature adjustor is configured to adjust the temperature of the hydrogen generating material. The controller is configured to control the water supply and the temperature adjuster. The hydrogen generating material includes a two-dimensional hydrogen boride sheet having a two-dimensional network. The two-dimensional hydrogen boride sheet contains negatively charged boron atoms.

The controller is configured to execute in a hydrogen generating mode and in a regenerating mode. During the hydrogen generating mode, the controller controls the temperature adjustor to heat the hydrogen generating material at a first predetermined temperature so as to generate hydrogen from the hydrogen generating material. During the regenerating mode, the controller controls the temperature adjustor to adjust the temperature of the hydrogen generating material to a second predetermined temperature, which is lower than the first predetermined temperature, and controls the water supply to supply water to the hydrogen generating material.

DETAILED DESCRIPTION

Figure 1:
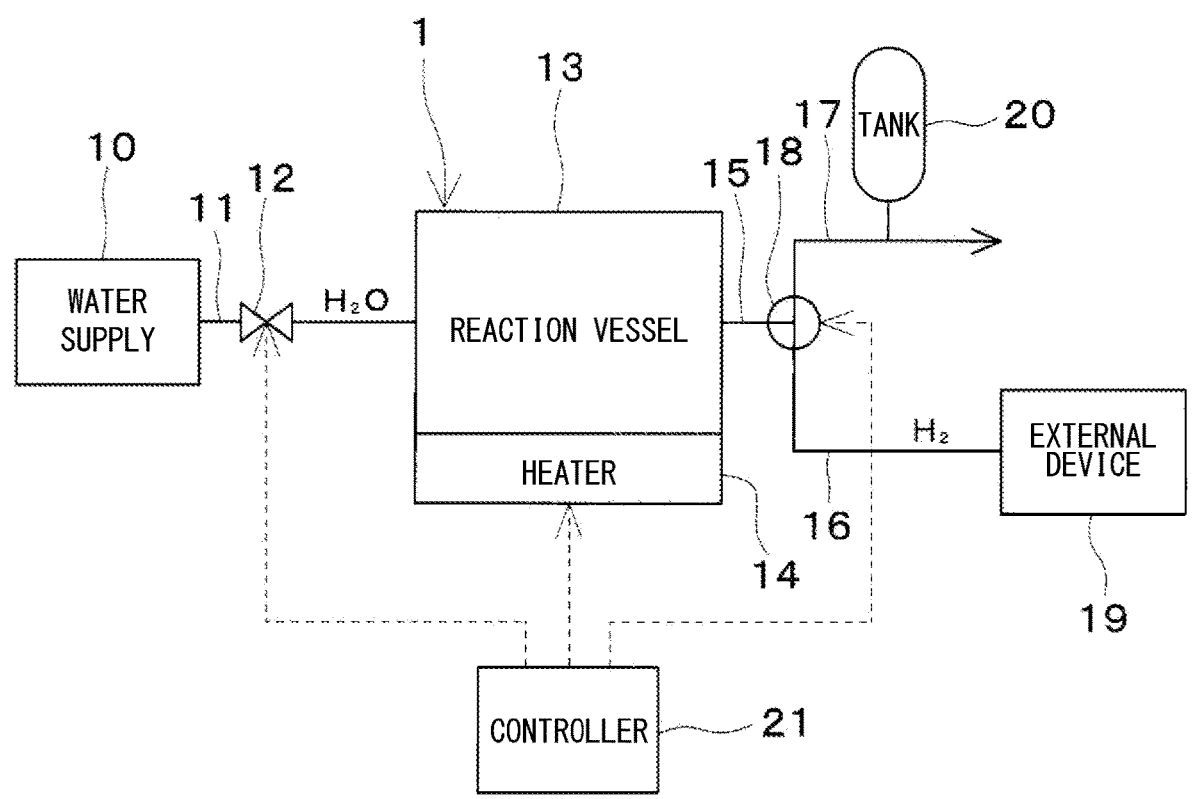
FIG. 1 is a diagram of a hydrogen generator of an embodiment of the present disclosure.

To begin with, examples of relevant techniques will be described.

Hydrogen releases large amount of energy when reacting with oxygen and generates water only. Thus, hydrogen is a non-polluting fuel that can be used as an alternative to fossil fuels. In order to use hydrogen fuel as an in-vehicle energy source for fuel cells, hydrogen engines, and the like, it is necessary to store hydrogen safely and lightly in weight.

A hydrogen generator configured to generate hydrogen by reacting a metal borohydride ($MBH_4$, where M=Na, Li, K) with water in the presence of a catalyst has been known. The metal borohydride is a hydrogen generating material. In this device, an aqueous solution in which the metal borohydride is dissolved is brought into contact with the catalyst, so that hydrogen can be generated by the following reaction formula (1). As a result, the device can be downsized compared with a case using a high-pressure hydrogen tank or a liquid hydrogen tank.

$$MBH_4 + 2H_2O \rightarrow 4H_2 + MBO_2 \qquad (1)$$

In the reaction formula (1), a boron atom of the metal borohydride is positively charged, so that the boron atom preferentially bonds with oxide ions. Therefore, in the reaction formula (1), the metal borohydride is converted into a metal borate ($MBO_2$). In order to continuously generate hydrogen with the hydrogen generator, it is necessary to supplement a new metal borohydride from an external of the device or to regenerate the metal borohydride from the metal borate.

Regeneration of the metal borohydride ($NaBH_4$) from the metal borate ($NaBO_2$) using $MgH_2$ is proposed.

However, the proposed regeneration method requires a large-scale reaction vessel. On the other hand, when the hydrogen generator is mounted in a vehicle where frequent refueling is required, it is necessary to simplify the operation for regenerating the hydrogen generating material.

In view of the above points, it is the object of the present disclosure to provide a hydrogen generator that is configured to generate hydrogen from a hydrogen generating material and that is capable of continuously generating hydrogen from the hydrogen generating material with a simple configuration.

In order to achieve the above objects, a hydrogen generator includes a reaction vessel, a water supply, a temperature adjustor, and a controller. The reaction vessel houses a hydrogen generating material that has hydrogen generating ability. The water supply is configured to supply water to the hydrogen generating material. The temperature adjustor is configured to adjust the temperature of the hydrogen generating material. The controller is configured to control the water supply and the temperature adjuster. The hydrogen generating material includes a two-dimensional hydrogen boride sheet having a two-dimensional network. The two-dimensional hydrogen boride sheet contains negatively charged boron atoms.

The controller is configured to execute in a hydrogen generating mode and in a regenerating mode. During the hydrogen generating mode, the controller controls the temperature adjustor to heat the hydrogen generating material at a first predetermined temperature so as to generate hydrogen from the hydrogen generating material. During the regenerating mode, the controller controls the temperature adjustor to adjust the temperature of the hydrogen generating material to a second predetermined temperature, which is lower than the first predetermined temperature, and controls the water supply to supply water to the hydrogen generating material. As a result, the hydrogen generating ability of the hydrogen generating material is recovered.

Thus, the hydrogen generating ability of the hydrogen generating material can be recovered with a simple configuration and hydrogen can be continuously generated.

Hereinafter, an embodiment of the present disclosure will be described with reference to the drawings. As shown in FIG. 1, a hydrogen generator 1 includes a water supply 10, a reaction vessel 13, a heater 14, a controller 21, and the like.

The water supply 10 stores therein a predetermined amount of water ($H_2O$) and is configured to supply water to the reaction vessel 13. The water supply 10 can be replenished with water from the outside of the water supply 10. The water supplied from the water supply 10 to the reaction vessel 13 may be in a solid, a liquid, or a gas state. In the present embodiment, gaseous water (i.e., water vapor) is supplied to the reaction vessel 13 from the water supply 10.

Water is supplied from the water supply 10 to the reaction vessel 13 through a water supply passage 11. An on-off valve 12 is provided in the water supply passage 11. The on-off valve 12 is configured to selectively open and close the water supply passage 11, so that the start and stop of supplying water from the water supply 10 to the reaction vessel 13 can be switched.

Although not shown in FIG. 1, a carrier gas supply device for supplying carrier gas to the reaction vessel 13 may be provided. An inert gas can be used as the carrier gas. By supplying the carrier gas to the reaction vessel 13, gas generated in the reaction vessel 13 can be efficiently conveyed.

The reaction vessel 13 houses therein a hydrogen generating material. The hydrogen generating material is a material containing hydrogen atoms and has hydrogen generating ability of generating hydrogen. The hydrogen generating material can regain hydrogen atoms, which are reduced for hydrogen generation, and thus the hydrogen generating ability of the hydrogen generating material can be recovered. In this embodiment, a material including a two-dimensional hydrogen boride sheet is used as the hydrogen generating material. The two-dimensional hydrogen boride sheet will be described in detail later.

The heater 14 is disposed adjacent to the reaction vessel 13. The heater 14 is a heating device configured to heat the reaction vessel 13. The heater 14 may be an electric heater. The heater 14 can adjust the heating temperature of the reaction vessel 13. The heater 14 heats the reaction vessel 13, so that the hydrogen generating material in the reaction vessel 13 is heated. The heater 14 corresponds to the temperature adjustor configured to adjust the temperature of the material including the two-dimensional hydrogen boride sheet.

When the hydrogen generating material is heated, a hydrogen generating reaction of the hydrogen generating material occurs in the reaction vessel 13 and hydrogen is generated from the hydrogen generating material. Further, the regenerating reaction of the hydrogen generating material occurs in the reaction vessel 13 using the water supplied from the water supply 10. Oxygen is generated as a by-product in the regenerating reaction of the hydrogen generating material. The hydrogen generating reaction and the regenerating reaction of the hydrogen generating material will be described in detail later.

The gas generated in the reaction vessel 13 is discharged from the reaction vessel 13 through a gas discharge passage 15. The gas discharge passage 15 branches into a first discharge passage 16 and a second discharge passage 17. A passage switching valve 18 is provided at a branch point of the gas discharge passage 15. The passage switching valve 18 is configured to switch a passage of the discharged gas from the reaction vessel 13 between the first discharge passage 16 and the second discharge passage 17.

When the produced gas in the reaction vessel 13 is hydrogen, the passage switching valve 18 switches the passage of the discharged gas to the first discharge passage 16. An external device 19 is connected to the first discharge passage 16. The external device 19 is a hydrogen consuming device such as a fuel cell. The hydrogen supplied to the external device 19 through the first discharge passage 16 is consumed by the external device 19.

When the produced gas in the reaction vessel 13 is a non-hydrogen gas, the passage switching valve 18 switches the passage of the discharged gas to the second discharge passage 17. The non-hydrogen gas includes oxygen generated by the regenerating reaction of the hydrogen generating material. Oxygen ($O_2$) among the non-hydrogen gas is collected and stored in the oxygen tank 20. The non-hydrogen gas except for oxygen are discharged out of the system.

The hydrogen generator 1 includes a controller 21. The controller 21 includes a known microcomputer including CPU, ROM and RAM, and peripheral circuits. The controller 21 performs various calculations and processes based on control programs stored in the ROM, and controls operations of various control target devices of the hydrogen generator 1. The controller 21 of the present embodiment performs opening/closing control of the on-off valve 12, heating control with the heater 14, passage switching control of the passage switching valve 18, and the like. The controller 21 controls the supply of water from the water supply 10 to the reaction vessel 13 and controls the temperature of the reaction vessel 13.

Figure 2:
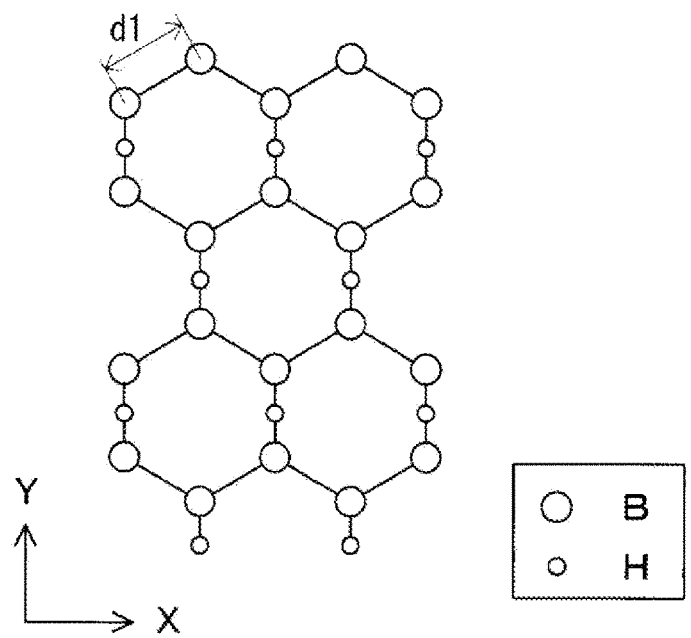
FIG. 2 is a schematic diagram representing an XY plane of a two-dimensional hydrogen boride sheet.

Here, with reference to FIGS. 2 to 4, the structure of the two-dimensional hydrogen boride sheet used as the hydrogen generating material of the present embodiment will be described. As shown in FIG. 2, the two-dimensional hydrogen boride sheet is a sheet having a two dimensional network that is formed only by boron atoms (B) and hydrogen atoms (H). The two-dimensional hydrogen boride sheet has a planar structure in which the boron atoms and the hydrogen atoms are connected with each other on a single plane. The two-dimensional hydrogen boride sheet has a feature that the boron atoms are negatively charged and the hydrogen atoms are positively charged.

The two-dimensional hydrogen boride sheet has a basic skeleton in which the boron atoms are arranged into hexagonal rings. In the two-dimensional hydrogen boride sheet, the hydrogen atoms are regularly arranged at specific positions in the hexagonal rings of the boron atoms. The hexagonal rings composed of the boron atoms are continuously connected to one another without gaps, thereby forming a two-dimensional network that is a mesh-like planar structure. The two-dimensional hydrogen boride sheet has atomic sites at which two adjacent boron atoms are bound to a single same hydrogen atom.

The two-dimensional hydrogen boride sheet is a thin film-like substance having the two-dimensional network consisting of boron atoms and hydrogen atoms. In the two-dimensional hydrogen boride sheet of the present embodiment, the total number of the boron atoms and the hydrogen atoms forming the mesh-like planar structure is 1000 or more.

In FIG. 2, the bonding distance d1 between two adjacent boron atoms is in the range from 0.155 nm to 0.185 nm. In FIG. 3, the bonding distance d2 between two adjacent boron atoms via one hydrogen atom is in the range from 0.155 nm to 0.185 nm. In FIG. 3, the bonding distance d3 between the boron atom and the hydrogen atom adjacent to each other is in the range from 0.125 nm to 0.135 nm.

The thickness of the two-dimensional hydrogen boride sheet of the present embodiment is in the range from 0.23 nm to 0.50 nm. In the two-dimensional hydrogen boride sheet, a length in at least one direction (for example, a length in the X direction or a length in the Y direction in FIG. 2) is preferably 100 nm or longer. The size (i.e., an area) of the two-dimensional hydrogen boride sheet is not particularly limited, and the two-dimensional hydrogen boride sheet can be formed into an arbitrary size depending on a production method.

Figure 3:
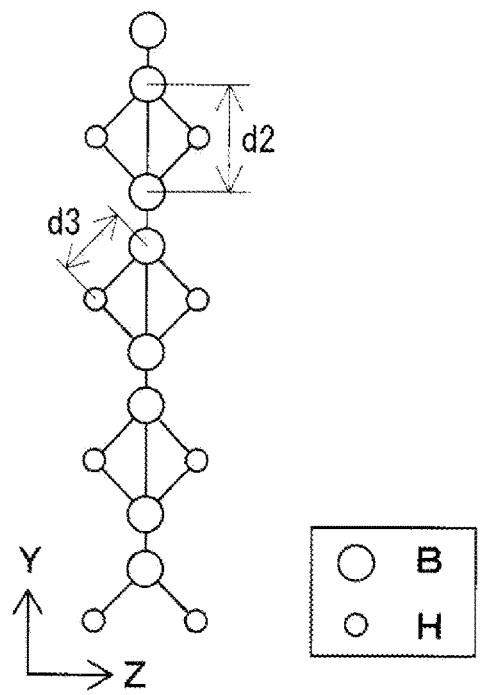
FIG. 3 is a schematic diagram representing a YZ plane of the two-dimensional hydrogen boride sheet.
Figure 4:
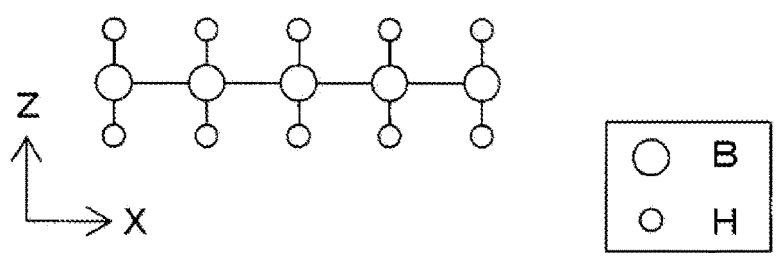
FIG. 4 is a schematic diagram representing a ZX plane of the two-dimensional hydrogen boride sheet.

The two-dimensional hydrogen boride sheet has a local structure as shown in FIGS. 2 to 4. The two-dimensional hydrogen boride sheet has a structure that locally has a short-range order but does not have a long-range order. The two-dimensional hydrogen boride sheet does not have a specific periodic regularity and the two-dimensional hydrogen boride sheets are randomly bound to each other without aggregation. The two-dimensional hydrogen boride sheet of the present embodiment is in the form of powdered state.

In the two-dimensional hydrogen boride sheet, the bonds between the boron atoms forming the hexagonal rings and the bonds between the boron and the hydrogen atom are strong. Thus, even if multiple two-dimensional hydrogen boride sheets are stacked with each other during the production step to form a crystal (i.e., an agglomerate), the crystal can be easily cleaved perpendicular to the crystal plane like a graphite and be separated into single-layered two-dimensional hydrogen boride sheets.

Here, a method for producing the two-dimensional hydrogen boride sheet of the present embodiment will be described. In this embodiment, the same method disclosed in WO 2018/074518 A1 is used. The method for producing the two-dimensional hydrogen boride sheet includes a step of mixing metal diboride and an ion exchange resin in a polar organic solvent and a step of filtering the mixed solution.

The metal diboride has a hexagonal ring structure. As the metal diboride, for example, $AlB_2$, $MgB_2$, $TaB_2$, $ZrB_2$, $ReB_2$, $CrB_2$, $TiB_2$, and $VB_2$ can be used. It is preferable to use $MgB_2$ as the metal diboride because $MgB_2$ can easily exchange ions with the ion exchange resin in the polar organic solvent.

As the ion exchange resin, a resin having functional groups (for example, a sulfonyl group or a carboxyl group) to which ions exchangeable with metal ions constituting the metal diboride are coordinated can be used. Examples of the ion exchange resin having such a functional group include a polymer of styrene, a polymer of divinylbenzene, a copolymer of styrene and divinylbenzene, and the like. The functional group to which ions exchangeable with metal ions constituting the metal diboride are coordinated is preferable a sulfonyl group because the sulfonyl group can easily exchange ions with the metal diboride.

The polar organic solvent is not particularly limited, and examples of the polar organic solvent include acetonitrile, N,N-dimethylformamide, methanol and the like. Among these, acetonitrile is preferable as no oxygen is contained in acetonitrile.

In the present embodiment, the two-dimensional hydrogen boride sheet was produced using $MgB_2$ as the metal diboride and an ion exchange resin having a sulfonyl group as the ion exchange resin. As a result, magnesium ions ($Mg^{2+}$) of magnesium diboride are exchanged with hydrogen ions ($H^+$) of the sulfonyl group of the ion exchange resin to produce the two-dimensional hydrogen boride sheet having the smallest unit $(HB)_4$.

Next, with reference to FIG. 5, the result of X-ray photoelectron spectroscopy (XPS) analysis of the product that is produced by the above-mentioned method will be described. In the X-ray photoelectron spectroscopic analysis, surface of the product is irradiated with X-ray and the kinetic energy of photoelectrons emitted by the irradiation is measured. Thereby, the constituent elements of the product and electronic states of the constituent elements can be analyzed.

Figure 5:
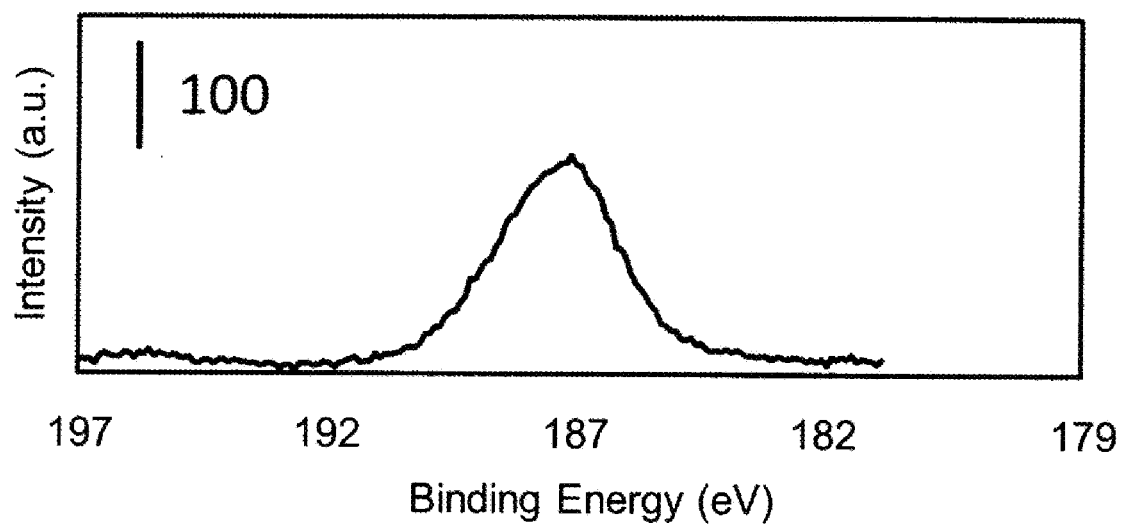
FIG. 5 is a diagram showing results of X-ray photoelectron spectroscopy analysis of the two-dimensional hydrogen boride sheet.

As shown in FIG. 5, in the spectrum obtained by X-ray photoelectron spectroscopy, the peak attributed to B1s of boron atoms appears in the vicinity of 187.5 eV. The "vicinity" in the "vicinity of 187.5 eV" means "±1.0 eV", and the peak attributed to B1s of boron atoms exists within the range of 187.5±1.0 eV. On the other hand, no peak attributed to Mg2p of magnesium atoms was observed. This indicates that the product contains boron and does not contain magnesium. This is because magnesium ions of the raw material $MgB_2$ are exchanged with hydrogen ions of the sulfonyl group of the ion exchange resin.

The two-dimensional hydrogen boride sheet of the present embodiment is represented by the chemical formula $(H_XB_Y)_n$ (n≥4, X≤Y, where n is integer). $(H_XB_Y)_4$ represents a unit cell of the two-dimensional hydrogen boride sheet. The number of hydrogen atoms contained in the two-dimensional hydrogen boride sheet of the present embodiment varies. The two-dimensional hydrogen boride sheet of the present embodiment retains the two-dimensional network structure even if the number of hydrogen atoms contained in the two-dimensional hydrogen boride sheet varies.

The molar ratio (X/Y) of boron atoms (B) to hydrogen atoms (H) varies between (X/Y)=1 and (X/Y)<1. In the two-dimensional hydrogen boride sheet, the case where the molar ratio (X/Y) of boron atoms (B) to hydrogen atoms (H) is 1 is a state where the hydrogen atoms contained in the two-dimensional hydrogen boride sheet is the largest and the case can be expressed as $(HB)_n$.

The two-dimensional hydrogen boride sheet of the present embodiment is a material that can store and release hydrogen. The two-dimensional hydrogen boride sheet can release hydrogen by the hydrogen generating reaction and after that, the two-dimensional hydrogen boride sheet can increase the amount of hydrogen stored therein by the regenerating reaction.

By heating the two-dimensional hydrogen boride sheet at the first predetermined temperature, the hydrogen generating reaction represented by the following reaction formula (2) occurs.

$$2(HB)_n \rightarrow (2/Y)(H_XB_Y)_n + n(1-X/Y)H_2 \qquad (2)$$

In the hydrogen generating reaction, hydrogen is released from the two-dimensional hydrogen boride sheet, and the number of the hydrogen atoms contained in the two-dimensional hydrogen boride sheet is reduced. In the two-dimensional hydrogen boride sheet, only the molar ratio of boron to hydrogen fluctuates due to the hydrogen generating reaction, and the basic skeleton in which boron atoms are arranged in hexagonal rings does not change before and after releasing hydrogen. That is, the two-dimensional network structure does not change.

The first predetermined temperature is preferably within the range of 60 to 500° C., more preferably within the range of 200 to 350° C.

When the first predetermined temperature is low, hydrogen is not sufficiently generated from the two-dimensional hydrogen boride sheet. Therefore, in order to secure the amount of hydrogen generated by the hydrogen generating reaction, the lower limit of the first predetermined temperature is preferably 60° C. or higher, and more preferably 200° C. or higher.

In order to proceed with the hydrogen generation reaction effectively, it is preferable that the first predetermined temperature be as high as possible. On the other hand, when the heating temperature of the two-dimensional hydrogen boride sheet exceeds 500° C., it becomes difficult to regenerate the two-dimensional hydrogen boride sheet by the regenerating reaction. Therefore, the upper limit of the first predetermined temperature is preferably 500° C. or lower, and more preferably 350° C. or lower.

As the hydrogen generating reaction proceeds, the number of hydrogen atoms contained in the two-dimensional hydrogen boride sheet decreases and the hydrogen generating ability deteriorates. The two-dimensional hydrogen boride sheet of the present embodiment can increase the number of hydrogen atoms contained in the two-dimensional hydrogen boride sheet in the subsequent regenerating reaction to recover the hydrogen generating ability.

After heating the two-dimensional hydrogen boride sheet at the first predetermined temperature, the temperature is lowered to the second predetermined temperature that is lower than the first predetermined temperature. Then, water ($H_2O$) is supplied to the two-dimensional hydrogen boride sheet, so that the regenerating reaction shown in a reaction formula (3) occurs. Water is a source of hydrogen atoms in the regenerating reaction.

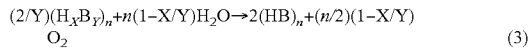

$$(2/Y)(H_XB_Y)_n + n(1-X/Y)H_2O \rightarrow 2(HB)_n + (n/2)(1-X/Y)O_2 \quad (3)$$

Because the boron atoms in the two-dimensional hydrogen boride sheet are negatively charged, protons contained in water preferentially bind to the two-dimensional hydrogen boride sheet in the regenerating reaction. In the regenerating reaction, the number of hydrogen atoms contained in the two-dimensional hydrogen boride sheet increases and the amount of the stored hydrogen increases. As a result, the hydrogen generating ability of the two-dimensional hydrogen boride sheet is recovered. In the regenerating reaction, oxygen is produced as a by-product.

Water ($H_2O$) supplied to the two-dimensional hydrogen boride sheet may be in any state such as gas, liquid, and solid states for the regenerating reaction The easier the water diffuses, the more likely the regenerating reaction is to occur. For this reason, water supplied to the two-dimensional hydrogen boride sheet is most preferably in a gas state than in a liquid state.

The second predetermined temperature is preferably within the range of 0 to 200° C. When the second predetermined temperature is lower than 0° C., water becomes solid which is difficult to diffuse. As a result, the regenerating reaction is less likely to occur. On the other hand, when the second predetermined temperature exceeds 200° C., the regenerating reaction, which is an exothermic reaction, is less likely to occur. In order to promote the regenerating reaction, which is an exothermic reaction, it is preferable that the second predetermined temperature be low within a range of 0 to 200° C.

Next, the operation of the hydrogen generator 1 of the present embodiment will be described. The hydrogen generator 1 of the present embodiment is configured to operate in the hydrogen generating mode to generate hydrogen by the hydrogen generating reaction and in the regenerating mode to regenerate the two-dimensional hydrogen boride sheet by the regenerating reaction. The hydrogen generating mode and the regenerating mode are controlled and executed by the controller 21.

During the hydrogen generating mode, the heater 14 heats the two-dimensional hydrogen boride sheet housed in the reaction vessel 13 at the first predetermined temperature. In the present embodiment, the first predetermined temperature is 350° C. At this time, the on-off valve 12 is closed to stop the supply of water from the water supply 10 to the reaction vessel 13. During the hydrogen generating mode, the hydrogen generating reaction shown in the reaction formula (2) occurs in the reaction vessel 13, so that hydrogen is generated.

The hydrogen generated in the reaction vessel 13 is discharged through the gas discharge passage 15. The gas passage is switched to the first discharge passage 16 by the passage switching valve 18, and the hydrogen discharged from the reaction vessel 13 is supplied to the external device 19 through the first discharge passage 16.

During the regenerating mode, the temperature of the reaction vessel 13 is lowered from the first predetermined temperature to the second predetermined temperature. In the present embodiment, the second predetermined temperature is 80° C. The reaction vessel 13 can be cooled by stopping the heating by the heater 14 and through natural heat dissipation.

During the regenerating mode, the on-off valve 12 is opened to supply water from the water supply 10 to the reaction vessel 13. Water in the form of water vapor is supplied to the reaction vessel 13. In the regenerating mode, it is required that water exist in the reaction vessel 13 housing the two-dimensional hydrogen boride sheet. Thus, it is not necessarily to keep suppling water from the water supply 10 throughout the regenerating mode. For example, water may be supplied from the water supply 10 in the first half of the regenerating mode.

During the regenerating mode, the regenerating reaction shown by the reaction formula (3) occurs inside the reaction vessel 13. By the regenerating reaction, the number of hydrogen atoms contained in the two-dimensional hydrogen boride sheet is increased and storage amount of hydrogen in the two-dimensional hydrogen boride sheet can be increased. Through the regenerating reaction, oxygen is produced as a by-product.

The oxygen generated in the reaction vessel 13 is discharged through the gas discharge passage 15. The gas passage is switched to the second discharge passage 17 by the passage switching valve 18. The oxygen discharged from the reaction vessel 13 is separated from the generated gas and collected in the oxygen tank 20. The generated gas except for oxygen is exhausted to the outside of the hydrogen generator 1.

The hydrogen generator 1 of the present embodiment alternately executes the hydrogen generating mode and the regenerating mode. As a result, hydrogen generation and regeneration of the two-dimensional hydrogen boride sheet are repeatedly performed, so that the hydrogen generator 1 can continuously generate hydrogen.

Figure 6:
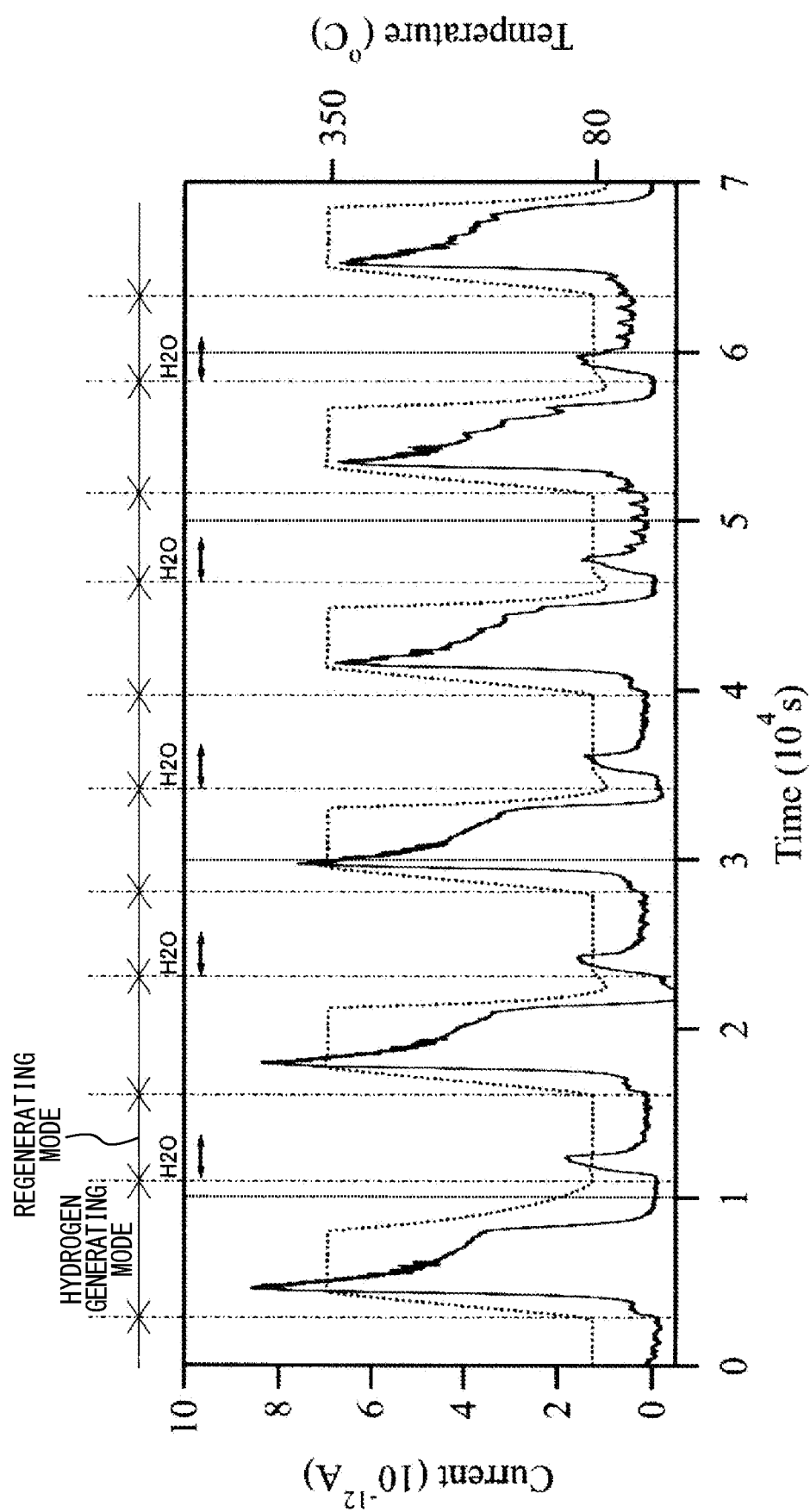
FIG. 6 is a diagram showing results of a thermal desorption mass spectroscopy analysis that measures an amount of hydrogen generated by the hydrogen generator.

Here, with reference to FIG. 6, the results of the thermal desorption mass spectrometry that measures the amount of hydrogen generated by the hydrogen generator 1 of the present embodiment will be described. The horizontal axis of FIG. 6 is time. The vertical axis of FIG. 6 is ion current, which indicates the amount of hydrogen generated by the hydrogen generator 1. In FIG. 6, the broken line indicates the temperature of the two-dimensional hydrogen boride sheet and the solid line indicates the current measured by the thermal desorption mass spectrometer.

In the example shown in FIG. 6, water (i.e., water vapor) was supplied to the reaction vessel 13 together with the carrier gas in the regenerating mode. The ratio of water vapor to the mixed gas of water vapor and the carrier gas was 40%.

As shown in FIG. 6, the hydrogen generator 1 of the present embodiment alternately executes the hydrogen generating mode and the regenerating mode. During the hydrogen generating mode, the two-dimensional hydrogen boride sheet was heated at the first predetermined temperature (350° C.). During the regenerating mode, the temperature of the two-dimensional hydrogen boride sheet was lowered to the second predetermined temperature (80° C.) and water was supplied to the two-dimensional hydrogen boride sheet.

In the hydrogen generating mode, the current is increasing, and thus hydrogen generation from the two-dimensional hydrogen boride sheet can be detected. The current rises and then falls. This indicates that as the hydrogen generating mode proceeds, the number of hydrogen atoms contained in the two-dimensional hydrogen boride sheet decreases and the hydrogen generating ability of the two-dimensional hydrogen boride sheet deteriorates.

After the current is decreased in the hydrogen generating mode, the regenerating mode is executed. As a result, the current increases again in the subsequent hydrogen generating mode after the regenerating mode and hydrogen generation can be detected. This indicates that the hydrogen generating ability of the two-dimensional hydrogen boride sheet is recovered by executing the regenerating mode. In the regenerating mode, the current slightly increases when water is supplied. This is because the two-dimensional hydrogen boride sheet generates heat when water is supplied and hydrogen is generated due to the generated heat.

In the hydrogen generator 1 of the present embodiment described above, a two-dimensional hydrogen boride sheet in which boron atoms are negatively charged is used as the hydrogen generating material. During the hydrogen generating mode, the two-dimensional hydrogen boride sheet is heated at the first predetermined temperature. During the regenerating mode, the temperature of the two-dimensional hydrogen boride sheet is lowered to the second predetermined temperature and water is supplied to the two-dimensional hydrogen boride sheet. Then, the hydrogen generating mode and the regenerating mode are alternately performed, thereby repeatedly performing hydrogen generation and regeneration of the two-dimensional hydrogen boride sheet. As a result, in the hydrogen generator 1 of the present embodiment, the hydrogen generating ability of the hydrogen generating material can be recovered with a simple configuration and hydrogen can be continuously generated by the hydrogen generator 1.

Other Embodiments

The present disclosure is not limited to the embodiment described above, but may be modified in various ways as hereinbelow without departing from the gist of the present disclosure. Further, means disclosed in the above embodiments may be appropriately combined within a range that can be implemented.

For example, in the hydrogen generator 1 of the above embodiment, a cooling device for cooling the reaction vessel 13 in the regenerating mode may be provided. The cooling device may be an air cooling fan or a water cooling radiator. The regenerating reaction can be promoted by cooling the reaction vessel 13 with the cooling device in the regenerating mode. When the reaction vessel 13 is provided with a carrier gas supply device for supplying the carrier gas, the two-dimensional hydrogen boride sheet can be cooled by the carrier gas.

Further, in the hydrogen generator 1 of the above embodiment, an exhaust device may be provided in the first discharge passage 16. As a result, the generated hydrogen in the hydrogen generating mode can be supplied to the external device 19 in a shorter time.

What is claimed is:

1. A hydrogen generator comprising:
a reaction vessel housing a hydrogen generating material that has hydrogen generating ability;
a water supply configured to supply water to the hydrogen generating material;
a temperature adjustor configured to adjust a temperature of the hydrogen generating material; and
a controller configured to control the water supply and the temperature adjustor, wherein
the hydrogen generating material includes a two-dimensional hydrogen boride sheet having a two-dimensional network, the two-dimensional hydrogen boride sheet containing negatively charged boron atoms,
the controller is configured to execute:
a hydrogen generating mode to generate hydrogen from the hydrogen generating material; and
a regenerating mode to recover the hydrogen generating ability of the hydrogen generating material, and
the controller is further configured to:
control the temperature adjustor to heat the hydrogen generating material at a first predetermined temperature during the hydrogen generating mode; and
control the temperature adjustor to adjust the temperature of the hydrogen generating material to a second predetermined temperature and control the water supply to supply water during the regenerating mode, wherein
the second predetermined temperature is lower than the first predetermined temperature.

2. The hydrogen generator according to claim 1, wherein the two-dimensional hydrogen boride sheet has a peak in a vicinity of 187.5 eV in a spectrum obtained by X-ray photoelectron spectroscopy, the peak being attributed to B1s of the negatively charged boron atoms.

3. The hydrogen generator according to claim 1, wherein the controller is further configured to alternately execute the hydrogen generating mode and the regenerating mode.

4. The hydrogen generator according to claim 1, wherein the first predetermined temperature is between 60° C. and 500° C.

5. The hydrogen generator according to claim 1, wherein the first predetermined temperature is between 200° C. and 350° C.

6. The hydrogen generator according to claim 1, wherein the second predetermined temperature is between 0° C. and 200° C.

\* \* \* \* \*